United States Patent
Yan et al.

(10) Patent No.: US 10,785,805 B2
(45) Date of Patent: Sep. 22, 2020

(54) COMMUNICATION METHOD AND COMMUNICATIONS APPARATUS

(71) Applicant: Huawei Technologies Co., Ltd., Shenzhen (CN)

(72) Inventors: Le Yan, Shanghai (CN); Qinghai Zeng, Shanghai (CN); Hongping Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/536,003

(22) Filed: Aug. 8, 2019

(65) Prior Publication Data

US 2020/0008245 A1    Jan. 2, 2020

Related U.S. Application Data

(63) Continuation of application No. PCT/CN2018/091540, filed on Jun. 15, 2018.

(30) Foreign Application Priority Data

Jun. 16, 2017 (CN) .......................... 2017 1 0459115

(51) Int. Cl.
*H04W 74/08* (2009.01)
*H04B 7/06* (2006.01)
(Continued)

(52) U.S. Cl.
CPC ...... *H04W 74/0833* (2013.01); *H04B 7/0695* (2013.01); *H04W 36/06* (2013.01); *H04W 36/30* (2013.01)

(58) Field of Classification Search
CPC . H04W 74/0833; H04W 36/06; H04W 36/30; H04B 7/0695
See application file for complete search history.

(56) References Cited

U.S. PATENT DOCUMENTS

2013/0301567 A1    11/2013  Jeong et al.
2014/0016573 A1*    1/2014  Nuggehalli .......... H04B 7/0617
                                                        370/329
(Continued)

FOREIGN PATENT DOCUMENTS

CN    104285385 A    1/2015
CN    104955061 A    9/2015
(Continued)

OTHER PUBLICATIONS

3GPP TS 38.321 V0.0.3 (May 2017); 3rd Generation Partnership Project; Technical Specification Group Radio Access Network; NR; Medium Access Control (MAC) protocol specification (Release 15); 20 pages.

(Continued)

*Primary Examiner* — Chi Ho A Lee
(74) *Attorney, Agent, or Firm* — Slater Matsil, LLP

(57) ABSTRACT

Embodiments of this application provide a communication method and a communications apparatus. The method includes: receiving identification information of N beams of a target cell and random access channel configurations of M beams in the N beams, where N and M are positive integers; and determining a beam for accessing based on signal quality or signal strength of L beams in the N beams, the identification information of the N beams, and the random access channel configurations of the M beams, where L is a nonnegative integer.

23 Claims, 6 Drawing Sheets

(51) Int. Cl.
*H04W 36/06* (2009.01)
*H04W 36/30* (2009.01)

(56) References Cited

U.S. PATENT DOCUMENTS

| | | | | |
|---|---|---|---|---|
| 2014/0177607 | A1* | 6/2014 | Li | H04B 7/0695 370/336 |
| 2015/0382205 | A1 | 12/2015 | Lee et al. | |
| 2017/0223744 | A1* | 8/2017 | Qian | H04W 74/0833 |
| 2017/0244460 | A1* | 8/2017 | Li | H04B 7/0619 |
| 2017/0332407 | A1* | 11/2017 | Islam | H04W 52/242 |
| 2017/0367120 | A1* | 12/2017 | Murray | H04L 5/0023 |
| 2018/0042000 | A1 | 2/2018 | Zhang et al. | |
| 2018/0192426 | A1* | 7/2018 | Ryoo | H04W 24/10 |
| 2018/0220344 | A1* | 8/2018 | Shaheen | H04W 4/60 |
| 2018/0368205 | A1* | 12/2018 | Park | H04L 5/0048 |
| 2019/0110234 | A1* | 4/2019 | Peisa | H04W 36/0072 |
| 2019/0132066 | A1* | 5/2019 | Park | H04W 36/0094 |

FOREIGN PATENT DOCUMENTS

| | | |
|---|---|---|
| CN | 106793124 A | 5/2017 |
| WO | 2015147717 A1 | 10/2015 |
| WO | 2016165128 A1 | 10/2016 |
| WO | 2017022902 A1 | 2/2017 |
| WO | 2017054432 A1 | 4/2017 |

OTHER PUBLICATIONS

Ericsson, "Further details of handover execution in NR", 3GPP TSG-RAN WG2 Meeting #97bis, Tdoc R2-1702672, Spokane, USA, Apr. 3-7, 2017, 6 pages.

Lenovo et al., "Consideration on details of NR handover", 3GPP TSG-RAN WG2 Meeting #98, R2-1705310, Hangzhou, China, May 15-19, 2017, 3 pages.

3GPP TS 38.331 V0.0.3 (May 2017); 3rd Generation Partnership Project; Technical Specification Group Radio Access Network; NR; Radio Resource Control (RRC); Protocol specification (Release 15); 20 pages.

NTT DOCOMO, INC.,"Discussion on mobility procedure for NR",3GPP TSG RAN WG1 Meeting #88 R1-1702833, Athen, Greece, Feb. 13-17, 2017,total 6 pages.

CMCC,"Beam Related Measurement Report and Inter-cell HO in NR",3GPP TSG-RAN WG2 Meeting #97 R2-1701921 (Revision of R2-1700532),Athens, Greece, Feb. 13-17, 2017,total 7 pages.

Huawei et al.,"Allocation of appropriate RACH resources for handover",3GPP TSG-RAN WG2 Meeting #98 R2-1704843,Hangzhou, China, May 15-19, 2017,total 5 pages.

Intel Corporation,"Basic handover procedure in NR",3GPP TSG-RAN WG2 #AdHoc Meeting R2-1707012,Qingdao, China, Jun. 27-29, 2017,total 7 pages.

Mediatek Inc., "Handover in NR Considering Multiple-beam Operation," 3GPP TSG-RAN WG2 Meeting#98, R2-1704525, Hangzhou, China, May 15-19, 2017, 6 pages.

\* cited by examiner

US 10,785,805 B2

COMMUNICATION METHOD AND COMMUNICATIONS APPARATUS

CROSS-REFERENCE TO RELATED APPLICATIONS

This application is a continuation of International Application No. PCT/CN2018/091540, filed on Jun. 15, 2018, which claims priority to Chinese Patent Application No. 201710459115.0, filed on Jun. 16, 2017. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

Mobile communications not only pursues maximization of a capacity, but also needs a broader coverage area. That is, a terminal that moves to anywhere needs to be covered by a wireless network signal. When a terminal moves towards another cell from a serving cell, to ensure service continuity of the terminal, the terminal needs to be handed over from the current serving cell to the another cell.

Currently, a serving cell handover process of a terminal in an LTE system is described as follows: A source base station (Source eNB, SeNB) determines to perform a serving cell handover on a terminal based on a measurement report reported by the terminal and initiates a handover request to a target base station (Target eNB, TeNB). After the SeNB obtains a handover request acknowledgement message from the TeNB, the SeNB sends a handover message to the terminal. The terminal initiates a random access process to the target base station based on an identifier of a target cell carried in the handover message, to obtain a TA value and an uplink resource, and sends a handover complete message to the target base station on the uplink resource.

However, a high-frequency technology is introduced in a current 5G system. During data transmission at a high frequency, a relatively large transmission loss is usually caused. To ensure effective service transmission, a high-frequency cell uses a beamforming technology to perform communication, that is, each high-frequency cell has a plurality of different beams used for communication. When a handover is performed on a terminal, how the terminal selects a beam for access needs an urgent solution.

SUMMARY

Embodiments of this application provide a communication method and a communications apparatus, to provide a proper beam access solution.

According to a first aspect, an embodiment of this application provides a communication method. The method includes receiving identification information of N beams of a target cell and random access channel configurations of M beams in the N beams, where N and M are positive integers. The method also includes determining a beam for accessing based on signal quality or signal strength of L beams in the N beams, the identification information of the N beams, and the random access channel configurations of the M beams, where L is a nonnegative integer.

In a possible design, the determining a beam for accessing based on signal strength of L beams in the N beams, the identification information of the N beams, and the random access channel configurations of the M beams includes: determining the beam for accessing based on the signal strength of the L beams in the N beams, strength threshold information, the identification information of the N beams, and the random access channel configurations of the M beams.

In a possible design, the method further includes: receiving the strength threshold information.

In a possible design, the strength threshold information includes a first beam signal strength threshold or strength threshold indication information, the strength threshold indication information is used to indicate a relationship between the first beam signal strength threshold and a second beam signal strength threshold, and the second beam signal strength threshold is a beam signal strength threshold carried in measurement configuration information.

In a possible design, the determining the beam for accessing based on the signal strength of the L beams in the N beams, strength threshold information, the identification information of the N beams, and the random access channel configurations of the M beams includes: determining, based on the signal strength of the L beams in the N beams, the strength threshold information, the identification information of the N beams, and the random access channel configurations of the M beams, a beam whose signal strength is greater than or equal to the first beam signal strength threshold from the M beams as the beam for accessing the target cell. Therefore, the beam that is for accessing the target cell and that is determined by the terminal has a random access channel configuration and high signal strength. In this way, a success rate of accessing the target cell by the terminal is higher.

In a possible design, the determining the beam for accessing based on the signal strength of the L beams in the N beams, strength threshold information, the identification information of the N beams, and the random access channel configurations of the M beams includes: when signal strength of each of the M beams is less than the first beam signal strength threshold, determining the beam for accessing, from the M beams based on the identification information of the N beams and the random access channel configurations of the M beams, the beam for accessing the target cell. Therefore, the beam that is for accessing the target cell and that is determined by the terminal has the random access channel configuration. In this way, a success rate of accessing the target cell by the terminal is high.

In a possible design, the determining the beam for accessing based on the signal strength of the L beams in the N beams, strength threshold information, the identification information of the N beams, and the random access channel configurations of the M beams includes: when signal strength of each of the M beams is less than the first beam signal strength threshold, determining, based on the identifiers of the N beams, the signal strength of the L beams, and the strength threshold information, a beam whose signal strength is greater than or equal to the first beam signal strength threshold from the L beams as the beam for accessing the target cell. Therefore, the beam that is for accessing the target cell and that is determined by the terminal belongs to the L beams. In this way, a success rate of accessing the target cell by the terminal is high.

In a possible design, the determining the beam for accessing based on the signal strength of the L beams in the N beams, strength threshold information, the identification information of the N beams, and the random access channel configurations of the M beams includes: determining, based on the signal strength of the L beams, the strength threshold information, the identification information of the N beams, a priority order of the N beams, and the random access channel configurations of the M beams, the beam for accessing the target cell.

In a possible design, the determining a beam for accessing based on signal strength of L beams in the N beams, the identification information of the N beams, and the random access channel configurations of the M beams includes: when none of the M beams is found, determining, based on the identification information of the N beams, a beam with highest signal strength in the L beams as the beam for accessing the target cell. Therefore, the terminal determines that the beam for accessing the target cell has a strongest signal in the L beams. In this way, a success rate of accessing the target cell by the terminal is high.

In a possible design, the identification information of the N beams includes synchronization signal block identification information and/or channel state information-reference signal identification information, where the determining a beam for accessing based on signal strength of L beams in the N beams, the identification information of the N beams, and the random access channel configurations of the M beams includes: determining the beam for accessing based on the signal strength of the L beams in the N beams, the strength threshold information, the identification information of the N beams, that a priority of a beam whose identification information is the channel state information-reference signal identification information is higher than that of a beam whose identification information is the synchronization signal block identification information, and the random access channel configurations of the M beams.

In a possible design, if none of the N beams is found, signal strength of the L beams or signal strength of each of the M beams is less than the first beam signal strength threshold, or none of the M beams is found, the method further includes: determining the first found beam as the beam for accessing, determining a beam with highest signal strength as the beam for accessing, randomly determining a found beam as the beam for accessing, or determining a beam with a highest priority in found beams as the beam for accessing. Therefore, the terminal determines, in a relatively flexible manner, the beam for accessing the target cell.

In a possible design, the random access channel configuration includes a preamble index and a time-frequency resource configuration.

According to a second aspect, an embodiment of this application provides a communication method. The method includes receiving, by a first network device, identification information of N beams of a target cell and random access channel configurations of M beams in the N beams that are sent by a second network device, where N and M are positive integers. The method also includes sending, by the first network device, the identification information of the N beams and the random access channel configurations of the M beams to a terminal.

In a possible design, the method further includes: receiving, by the first network device, serving beam change information of the terminal that is within a predetermined time period and that is sent by the terminal; and sending, by the first network device, the serving beam change information to the second network device, where the serving beam change information is used by the second network device to determine a validity period of the random access channel configurations of the M beams.

In a possible design, the method further includes: receiving, by the first network device, serving beam change information of the terminal that is within a predetermined time period and that is sent by the terminal; determining, by the first network device, a validity period of the random access channel configurations of the M beams based on the serving beam change information; and sending, by the first network device, the validity period of the random access channel configurations of the M beams to the second network device.

In a possible design, the random access channel configuration includes a preamble index and a time-frequency resource configuration.

In a possible design, the method further includes: sending, by the first network device, strength threshold information or quality threshold information of a beam signal to the terminal through a handover message.

According to a third aspect, an embodiment of this application provides a communication method. The method includes sending, by a second network device, identification information of N beams of a target cell and random access channel configurations of M beams in the N beams to a first network device, where N and M are positive integers.

Optionally, the method further includes: receiving, by the second network device, serving beam change information of a terminal that is within a predetermined time period and that is sent by the first network device; determining, by the second network device, a validity period of the random access channel configurations of the M beams based on the serving beam change information; and when the validity period expires, releasing, by the second network device, the random access channel configurations of the M beams.

Optionally, the method further includes: receiving, by the second network device, the validity period of the random access channel configurations of the M beams that is sent by the first network device; and when the validity period expires, releasing, by the second network device, the random access channel configurations of the M beams.

Optionally, the method further includes: sending, by the second network device, strength threshold information or quality threshold information of a beam signal to the terminal through system information.

According to a fourth aspect, an embodiment of this application provides a communications apparatus. The apparatus includes a receiving module, configured to receive identification information of N beams of a target cell and random access channel configurations of M beams in the N beams, where N and M are positive integers. The apparatus also includes a processing module, configured to determine a beam for accessing based on signal quality or signal strength of L beams in the N beams, the identification information of the N beams, and the random access channel configurations of the M beams, where L is a nonnegative integer.

In a possible design, the processing module is specifically configured to determine the beam for accessing based on the signal strength of the L beams in the N beams, strength threshold information, the identification information of the N beams, and the random access channel configurations of the M beams.

In a possible design, the receiving module is further configured to receive the strength threshold information.

In a possible design, the strength threshold information includes a first beam signal strength threshold or strength threshold indication information, the strength threshold indication information is used to indicate a relationship between the first beam signal strength threshold and a second beam signal strength threshold, and the second beam signal strength threshold is a beam signal strength threshold carried in measurement configuration information.

In a possible design, the processing module is specifically configured to determine, based on the signal strength of the L beams in the N beams, the strength threshold information, the identification information of the N beams, and the random access channel configurations of the M beams, a beam whose signal strength is greater than or equal to the first beam signal strength threshold from the M beams as the beam for accessing the target cell.

In a possible design, the processing module is specifically configured to: when signal strength of each of the M beams is less than the first beam signal strength threshold, determine, from the M beams based on the identification information of the N beams and the random access channel configurations of the M beams, the beam for accessing the target cell.

In a possible design, the processing module is specifically configured to: when signal strength of each of the M beams is less than the first beam signal strength threshold, determine, based on the identifiers of the N beams, the signal strength of the L beams, and the strength threshold information, a beam whose signal strength is greater than or equal to the first beam signal strength threshold from the L beams as the beam for accessing the target cell.

In a possible design, the processing module is specifically configured to determine, based on the signal strength of the L beams, the strength threshold information, the identification information of the N beams, a priority order of the N beams, and the random access channel configurations of the M beams, the beam for accessing the target cell.

In a possible design, the processing module is specifically configured to: when none of the M beams is found, determine, based on the identification information of the N beams, a beam with highest signal strength in the L beams as the beam for accessing the target cell.

In a possible design, the identification information of the N beams includes synchronization signal block identification information and/or channel state information-reference signal identification information, where the processing module is specifically configured to determine the beam for accessing based on the signal strength of the L beams in the N beams, the strength threshold information, the identification information of the N beams, that a priority of a beam whose identification information is the channel state information-reference signal identification information is higher than that of a beam whose identification information is the synchronization signal block identification information, and the random access channel configurations of the M beams.

In a possible design, the processing module is further configured to: if none of the N beams is found, signal strength of the L beams or signal strength of each of the M beams is less than the first beam signal strength threshold, or none of the M beams is found, determine the first found beam as the beam for accessing, determine a beam with highest signal strength as the beam for accessing, randomly determine a found beam as the beam for accessing, or determine a beam with a highest priority in found beams as the beam for accessing.

In a possible design, the random access channel configuration includes a preamble index and a time-frequency resource configuration.

It should be noted that the communications apparatus in the fourth aspect may be a terminal, or may be a chip inside a terminal.

According to a fifth aspect, an embodiment of this application provides a communications apparatus. The apparatus includes a receiving module, configured to receive identification information of N beams of a target cell and random access channel configurations of M beams in the N beams that are sent by a second network device, where N and M are positive integers. The apparatus also includes a sending module, configured to send the identification information of the N beams and the random access channel configurations of the M beams to a terminal.

In a possible design, the receiving module is further configured to receive serving beam change information of the terminal that is within a predetermined time period and that is sent by the terminal; and the sending module is further configured to send the serving beam change information to the second network device, where the serving beam change information is used by the second network device to determine a validity period of the random access channel configurations of the M beams.

In a possible design, the communications apparatus further includes a processing module, where the receiving module is further configured to receive serving beam change information of the terminal that is within a predetermined time period and that is sent by the terminal; the processing module is configured to determine a validity period of the random access channel configurations of the M beams based on the serving beam change information; and the sending module is further configured to send the validity period of the random access channel configurations of the M beams to the second network device.

In a possible design, the random access channel configuration includes a preamble index and a time-frequency resource configuration; and the sending module is further configured to send strength threshold information or quality threshold information of a beam signal to the terminal through a handover message.

It should be noted that the communications apparatus in the fifth aspect may be a network device, or may be a chip inside a network device.

According to a sixth aspect, an embodiment of this application provides a communications apparatus. The apparatus includes a sending module, configured to send identification information of N beams of a target cell and random access channel configurations of M beams in the N beams to a first network device, where N and M are positive integers.

In a possible design, the network device further includes a receiving module and a processing module, where the receiving module is configured to receive serving beam change information of a terminal that is within a predetermined time period and that is sent by the first network device; and the processing module is configured to: determine a validity period of the random access channel configurations of the M beams based on the serving beam change information; and after the validity period expires, release the random access channel configurations of the M beams.

In a possible design, the network device further includes a receiving module and a processing module, where the receiving module is configured to receive the validity period of the random access channel configurations of the M beams that is sent by the first network device; and the processing module is configured to: after the validity period expires, release the random access channel configurations of the M beams.

In a possible design, the sending module is further configured to send strength threshold information or quality threshold information of a beam signal to the terminal through system information.

It should be noted that the communications apparatus in the sixth aspect may be a network device, or may be a chip inside a network device.

According to a seventh aspect, an embodiment of this application provides a terminal, including a processor and a transceiver. The processor and the transceiver are configured to perform the communication method according to any one of the embodiments of this application in the first aspect.

According to an eighth aspect, an embodiment of this application provides a network device, including a processor and a transceiver. The processor and the transceiver are configured to perform the communication method according to any one of the embodiments of this application in the second aspect.

According to a ninth aspect, an embodiment of this application provides a network device, including a processor and a transceiver. The processor and the transceiver are configured to perform the communication method according to any one of the embodiments of this application in the third aspect.

According to a tenth aspect, an embodiment of this application provides a computer readable storage medium. When an instruction in the storage medium is executed by a processor of a communications apparatus, the communications apparatus can perform the communication method according to the embodiments of this application in the first aspect.

According to an eleventh aspect, an embodiment of this application provides a computer readable storage medium. When an instruction in the storage medium is executed by a processor of a communications apparatus, the communications apparatus can perform the communication method according to the embodiments of this application in the second aspect.

According to a twelfth aspect, an embodiment of this application provides a computer readable storage medium. When an instruction in the storage medium is executed by a processor of a communications apparatus, the communications apparatus can perform the communication method according to the embodiments of this application in the third aspect.

According to the communication method and the communications apparatus in the embodiments of this application, the terminal receives the identification information of the N beams and the random access channel configurations of the M beams in the N beams, and the terminal determines the beam for accessing based on the signal quality or signal strength of the L beams in the N beams, the identification information of the N beams, and the random access channel configurations of the M beams, providing a proper beam for accessing determining solution. Further, the beam for accessing in the embodiments is determined by the terminal based on the signal quality or signal strength of the L beams in the N beams and the received random access channel configurations of the M beams. Therefore, the beam for accessing determined in this manner can increase an access success rate of the terminal.

DETAILED DESCRIPTION OF ILLUSTRATIVE EMBODIMENTS

Figure 1:
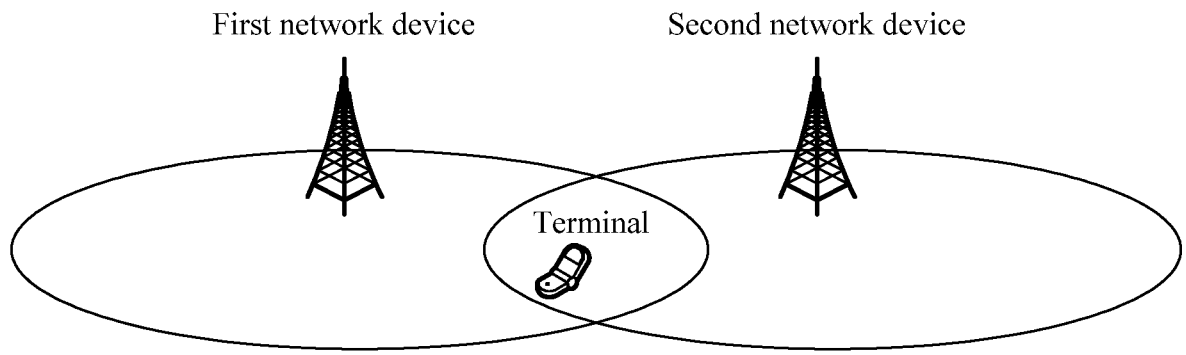
FIG. 1 is a schematic diagram of a communications system according to an embodiment of this application.

FIG. 1 is a schematic diagram of a communications system according to an embodiment of this application. As shown in FIG. 1, the communications system includes at least two network devices and at least one terminal. The at least two network devices communicate with the at least one terminal by using a technical solution provided in the following embodiments of this application. FIG. 1 shows one terminal and two network devices: a first network device and a second network device.

Some terms in this application are explained in the following, to help a person skilled in the art have a better understanding:

A network device is also referred to as a radio access network (RAN) device, is a device that connects a terminal to a radio network, and may be an evolved NodeB (eNB or eNodeB) in long term evolution (LTE), a relay node, an access point, or a gNB in a 5G network, for example, a transmission and reception point (TRP) or a controller. This is not limited herein.

A terminal may be a wireless or wired terminal. The wireless terminal may be a device having a wireless receiving and sending function, and may be deployed on land, including an indoor or outdoor terminal, a handheld terminal, or an in-vehicle terminal; or may be deployed on the water (for example, in a steamship); or may be deployed in the air (for example, on an airplane, on a balloon, or on a satellite). The terminal may be a mobile phone a tablet computer (Pad), a computer having a wireless receiving and sending function, a virtual reality (VR) terminal, an augmented reality (AR) terminal, a wireless terminal in industrial control, a wireless terminal in self driving, a wireless terminal in telemedicine, a wireless terminal in smart grid, a wireless terminal in transportation safety, a wireless terminal in smart city, a wireless terminal in smart home, or the like. This is not limited herein.

In this embodiment of this application, beams may include a transmit beam and a receive beam. The transmit beam may be signal strength distribution formed in different spatial directions after signals are transmitted through an antenna, and the receive beam may be signal strength distribution formed in different spatial directions after wireless signals are received through an antenna. It can be understood that one or more antenna ports for one beam may also be considered as an antenna port set. In other words, one antenna port set includes at least one antenna port.

Specifically, the beam may refer to a precoding vector having specific energy transmission directivity, and the precoding vector can be identified by using identification information. The energy transmission directivity means that a signal obtained by performing precoding processing by using the precoding vector is received at a relatively high receive power in a specific spatial location, for example, the receive power meets a reception demodulation signal-to-noise ratio. However, a signal obtained by performing precoding processing by using the precoding vector is received at a relatively low power in another spatial location, for example, the receive power does not meet a reception demodulation signal-to-noise ratio. Different communications devices may have different precoding vectors, that is, corresponding to different beams. One communications device may use one or more of a plurality of different precoding vectors at a same time point based on a configuration or capability of the communications device, that is, one or more beams may be formed simultaneously. The beam may be understood as a spatial resource. The beam may be identified by using identification information. Optionally, the identification information may be corresponding to a configured corresponding resource identifier (ID) of user equipment. For example, the identification information may be corresponding to a configured ID or resource of a channel state information-reference signal (CSI-RS), or may be corresponding to a configured ID or resource of an uplink sounding reference signal (SRS). Alternatively, optionally, the identification information may be identification information explicitly or implicitly carried on a signal or channel that is carried on a beam. For example, the identification information includes but is not limited to identification information of the beam indicated by a synchronization signal or broadcast channel that is sent by using the beam, and includes but is not limited to identification information of the beam indicated by a synchronization signal block (SS block) that is sent by using the beam. The SS block includes at least a primary synchronization signal (PSS), and/or a secondary synchronization signal (SSS), and/or a broadcast channel (PBCH).

It should be noted that descriptions are provided in the following method embodiments by using an example in which the first network device is a source base station and the second network device is a target base station.

Figure 2:
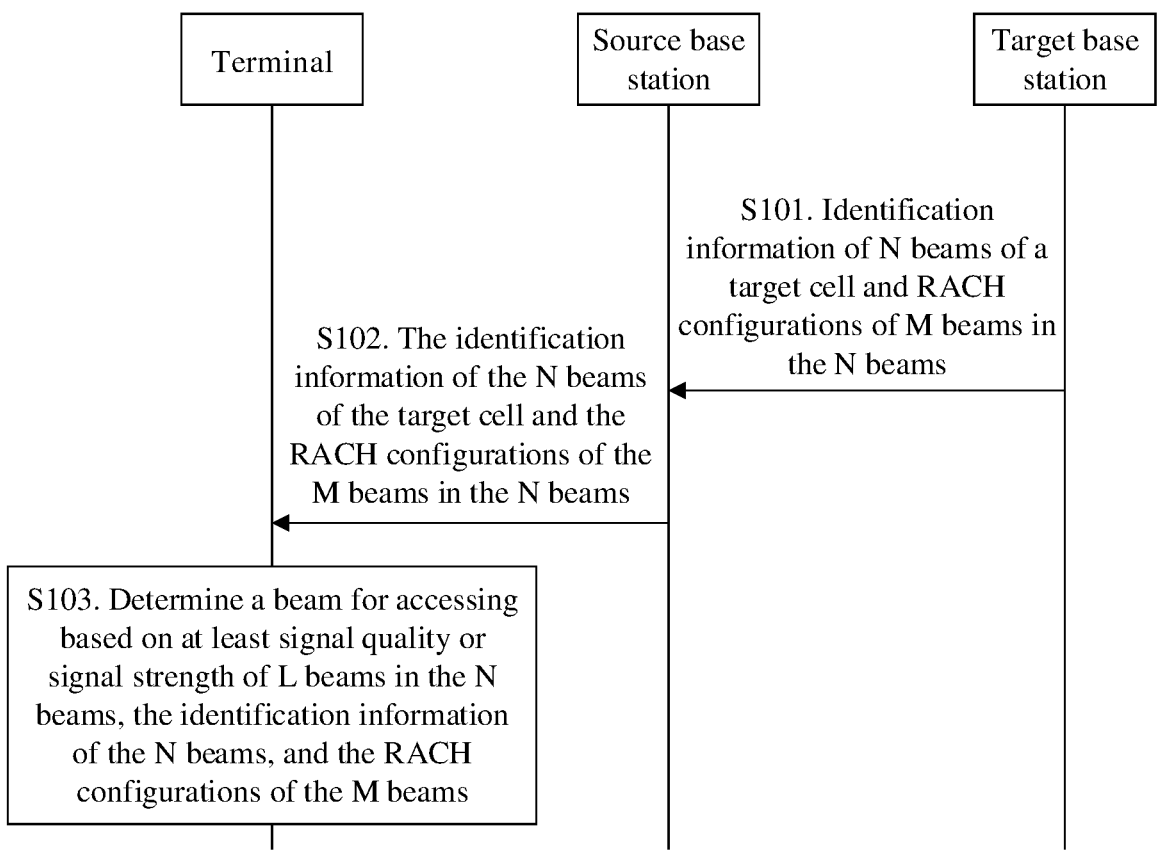
FIG. 2 is a flowchart of a communication method according to Embodiment 1 of this application.

FIG. 2 is a flowchart of a communication method according to Embodiment 1 of this application. As shown in FIG. 2, the method in this embodiment may include the following steps.

S101. A target base station sends identification information of N beams of a target cell and random access channel (RACH) configurations of M beams in the N beams to a source base station.

In this embodiment, the target base station performs admission control, to allow a terminal to be handed over from a serving cell to the target cell; and then the target base station sends the identification information of the N beams of the target cell and the RACH configurations of the M beams in the N beams to the source base station. The RACH configuration may be corresponding to an SS block, or may be corresponding to a CSI-RS. N and M are positive integers. Further, the target base station may alternatively send a cell identifier of the target cell to the source base station.

Optionally, before the target base station sends the information described in step S101 to the source base station, the target base station may receive a handover request message sent by the source base station. This is not limited in this embodiment.

The identification information of the N beams and the RACH configurations of the M beams may be included in a same message or different messages sent by the target base station to the source base station. Alternatively, the target base station may send the identification information of the N beams and the RACH configurations of the M beams to the source base station at a same time point or different time points.

Optionally, the identification information of the N beams and the RACH configurations of the M beams may be included in a handover request acknowledgement message sent by the target base station to the source base station.

S102. The source base station sends the identification information of the N beams of the target cell and the RACH configurations of the M beams in the N beams to a terminal.

In this embodiment, after receiving the identification information of the N beams and the RACH configurations of the M beams in the N beams that are sent by the target base station, the source base station sends the identification information of the N beams and the RACH configurations of the M beams in the N beams to the terminal.

The identification information of the N beams and the RACH configurations of the M beams may be included in a same message or different messages sent by the source base station to the terminal. Alternatively, the source base station may send the identification information of the N beams and the RACH configurations of the M beams to the terminal at a same time point or different time points.

Optionally, the identification information of the N beams and the RACH configurations of the M beams in the N beams may be included in a handover message sent by the source base station to the terminal. The handover message may be a radio resource control (RRC) connection reconfiguration message that carries a mobility control information element or another message such as another RRC message different from the RRC connection reconfiguration message, layer-1 signaling, or layer-2 signaling.

S103. The terminal determines a beam for accessing based on at least signal quality or signal strength of L beams in the N beams, the identification information of the N beams, and the RACH configurations of the M beams.

In this embodiment, the terminal determines the beam for accessing based on the signal quality or signal strength of the L beams, the identification information of the N beams, and the RACH configurations of the M beams. After determining the beam for accessing, the terminal uses the beam to access the target cell to which the beam belongs.

It can be understood that the terminal measures at least one found beam, to obtain signal quality or signal strength of the beam. The found beam is not limited to the N beams of the target cell. In other words, a beam of a cell other than the target cell may also be found. In addition, there is no limitation that each of the N beams needs to be measured.

Optionally, in one case, L herein may alternatively be considered as a quantity of beams whose signal quality or signal strength is detected.

Herein, the M beams and the L beams may have an intersection or may have no intersection. This is not limited in this embodiment of this application.

Signal quality of a beam may be first signal received quality of the beam. Signal strength of a beam may be a first signal received power of the beam. A first signal includes a synchronization signal and/or a reference signal.

In this embodiment, the source base station sends the identification information of the N beams and the RACH configurations of the M beams in the N beams to the terminal, and then the terminal determines the beam for accessing based on the signal quality or signal strength of the L beams in the N beams, the identification information of the N beams, and the RACH configurations of the M beams. Therefore, this embodiment provides a proper beam for accessing determining solution. Further, the beam for accessing in this embodiment is determined by the terminal based on the signal quality or signal strength of the L beams in the N beams and the received RACH configurations of the M beams. Therefore, the beam for accessing determined in this manner can increase a success rate of accessing a cell by the terminal, increasing a handover success rate.

The following describes, by using signal strength of a beam as an example, how to determine a beam for accessing. A solution of the signal quality is similar to the solution of the signal strength, and details are not described in the embodiments.

Figure 3:
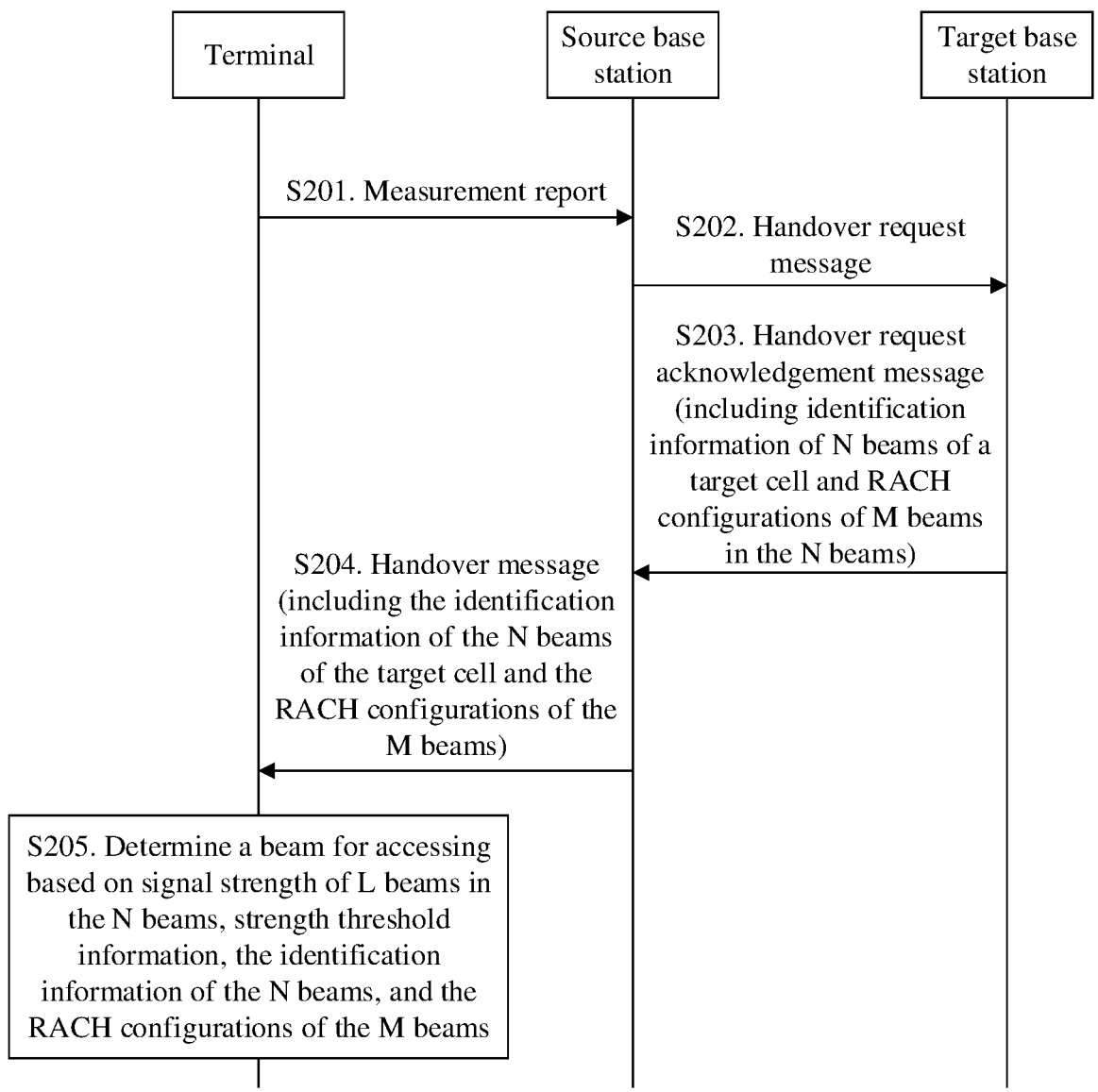
FIG. 3 is a flowchart of a communication method according to Embodiment 2 of this application.

FIG. 3 is a flowchart of a communication method according to Embodiment 2 of this application. As shown in FIG. 3, the method in this embodiment may include the following steps.

S201. A terminal sends a measurement report to a source base station.

Optionally, before sending the measurement report to the source base station, the terminal receives measurement configuration information sent by the source base station, and performs measurement for a serving cell and a neighboring cell based on the configuration information.

In a possible implementation, the configuration information is used to configure the terminal to measure beams of the serving cell and the neighboring cell. The configuration information includes but is not limited to a beam quantity K and a beam signal strength threshold that is X for short. The terminal determines signal strength of the serving cell and signal strength of the neighboring cell based on signal strength of K beams whose signal strength is greater than or equal to X. When the determined signal strength of the serving cell and the determined signal strength of the neighboring cell meet a corresponding measurement event determining condition, for example, a determining condition for an event A3, an event A4, an event A5, or another measurement event in LTE, the terminal sends the measurement report. The measurement report includes signal strength of at least one neighboring cell, and/or signal strength of K beams of each neighboring cell, identification information of the serving cell, and identification information of the at least one neighboring cell. The identification information of the serving cell and the identification information of the at least one neighboring cell include a cell ID or a cell index. Optionally, the measurement report may alternatively include identification information of K beams used to generate the signal strength of the neighboring cell or signal strength of K beams used to generate the signal strength of the neighboring cell.

It can be understood that the neighboring cell includes the target cell in the embodiment shown in FIG. 2. The configuration information may alternatively not carry the beam quantity or beam signal strength threshold information. In this case, the terminal measures signal strength of a cell.

Optionally, an SS block and a CSI-RS are reference signals and are transmitted on a beam. The measurement configuration information is specifically used to configure the terminal to measure the SS block and/or the CSI-RS transmitted on the beam. Correspondingly, signal strength of the beam includes signal strength of the SS block on the beam and/or signal strength of the CSI-RS on the beam. A quantity of beams whose signal strength is obtained by measuring the SS block may be the same as or different from a quantity of beams whose signal strength is obtained by measuring the CSI-RS. Correspondingly, a beam signal strength threshold corresponding to the measurement configuration information may include an SS block beam signal strength threshold and/or a CSI-RS beam signal strength threshold. In other words, X includes X1 and X2, where X1 is corresponding to the SS block beam signal strength threshold, X2 is corresponding to the CSI-RS beam signal strength threshold, and X1 may or may not be equal to X2.

Identification information of a beam in this embodiment may be identification information of an SS block transmitted on the beam and/or identification information of a CSI-RS transmitted on the beam.

The SS block is transmitted on a wide beam. The beam may be identified by using the identification information of the SS block. For example, the identification information of the SS block may be a time index indication (implicitly or explicitly) carried on a PBCH in the SS block.

The CSI-RS is transmitted on a narrow beam. The beam may be identified by using the identification information of the CSI-RS. For example, the identification information of the CSI-RS may be an identifier of a CSI-RS configuration. The CSI-RS configuration includes at least a resource configuration. The CSI-RS configuration may further include an antenna port used to send the CSI-RS, and the like.

Optionally, the measurement report may include information about at least one beam (the information about the beam herein may be signal strength of the beam and/or identification information of the beam) of the neighboring cell. The information about the at least one beam may be included in the measurement report in a form of a list. For example, beam identifiers of beams of each neighboring cell are arranged based on signal strength. The information about the at least one beam may be used by a target base station to determine beams (that is, M beams) configured with RACH configurations.

The terminal may determine report information about which beams of the neighboring cell in the measurement report, for example, in the following three manners. This is not limited in this embodiment.

In one manner, if a CSI-RS is measured, because a CSI-RS resource is configured by the source base station for the terminal in a measurement configuration message, if W CSI-RS resources are configured in the measurement configuration message, the terminal reports information about beams corresponding to the W CSI-RS resources, that is, information about a beam corresponding to each of the W CSI-RS resources.

In another manner, a measurement configuration message received by the terminal includes a threshold. The threshold Q is not equal to X. The threshold is used by the terminal to determine whether information about a beam needs to be reported. That is, if signal strength, measured by the terminal, of a beam of the neighboring cell is higher than (not lower than) the threshold, the terminal reports the information about the beam in the measurement report.

In another manner, optionally, the terminal reports information about a maximum of P beams based on a value P, or may report, based on the threshold Q, information about a maximum of P beams whose signal quality or signal strength is higher than Q. The value P may be a preset maximum value P, or may be included in the measurement configuration message sent by the source base station to the terminal.

It can be understood that the measurement report reporting manner and content of the measurement configuration information may be independent of this embodiment of this application, that is, may be applied to another solution different from this embodiment of this application.

S202. The source base station sends a handover request message to a target base station.

In this embodiment, the source base station receives the measurement report sent by the terminal, and performs handover decision based on the measurement report. The source base station may send the handover request message to a target base station to which a target cell belongs, where a neighboring cell with highest signal strength in a plurality of reported neighboring cells may be used as the target cell, and the handover request message may include an identifier of the target cell.

Optionally, the handover request message may further include information about at least one beam of the target cell (including signal strength of the beam and/or identification information of the beam).

Optionally, the source base station may send the handover request message to each of the plurality of neighboring cells based on signal strength of the plurality of neighboring cells in the measurement report. This can ensure that when the target base station does not allow the terminal to be handed over to the target cell, a base station to which another neighboring cell belongs can allow, based on the handover request message, the terminal to be handed over to the another neighboring cell.

The source base station may alternatively send the handover request message to the target base station based on, but not limited to, the measurement report sent by the terminal. For example, the source base station alternatively sends the handover request message to the target base station based on a current network status, or the like.

It can be understood that the handover request message is used as an example for description. Corresponding handover preparation interaction may alternatively be completed through another message, and such a type of message may be referred to as a first message.

S203. The target base station sends a handover request acknowledgement message to the source base station.

In this embodiment, the target base station replies to the source base station with the handover request acknowledgement message after performing admission control based on the handover request message. The handover request acknowledgement message includes identification information of N beams of the target cell and RACH configurations of M beams in the N beams.

It can be understood that the handover request acknowledgement message is used as an example for description. Corresponding handover preparation interaction may alternatively be completed through another message, and such a type of message may be referred to as a second message. The second message is an acknowledgement message for the first message.

S204. The source base station sends a handover message to the terminal.

In this embodiment, after receiving the handover request acknowledgement message, the source base station sends the handover message to the terminal. The handover message includes the identification information of the N beams of the target cell and the RACH configurations of the M beams.

It can be understood that the handover message is used as an example for description. A corresponding handover indication may alternatively be completed through another message, and such a type of message may be referred to as a third message.

Optionally, the identification information of the N beams may be sent in a form of a list. Certainly, the identification information of the N beams may alternatively be sent in another form. This is not limited in this embodiment.

It can be understood that the handover message may further carry corresponding priority information, and the priority information may be notified in different manners, and examples are as follows.

In a first manner, the identification information of the N beams is sent in the form of a list. The list has a priority order, that is, a beam order and a beam priority are bound in the list. For example, for identification information of the first beam in the list, the beam has a highest priority, and beams are arranged sequentially based on a priority order. Identification information of two beams is used as an example. If a list is {identification information of a beam 2, identification information of a beam 1}, a priority of the beam 2 is higher than a priority of the beam 1.

In a second manner, the identification information of the N beams is sent in a form of a list. The list further includes priority information corresponding to a beam. The priority information is used to indicate a beam priority. Two beams are used as an example. The two beams are sent in a form of a list. The list does not have a priority order, but the list includes priority information of the beams. If the list is {identification information of a beam 1 and priority information=2, identification information of a beam 2 and priority information=1}, it indicates that a priority of the beam 2 is higher than a priority of the beam 1.

S205. The terminal determines a beam for accessing based on signal strength of L beams in N beams, strength threshold information, identification information of the N beams, and RACH configurations of the M beams.

The strength threshold information may be pre-specified, or may be received by the terminal.

It can be understood that if the beam for accessing the target cell is determined based on signal quality, corresponding quality threshold information is used.

The terminal may receive the strength threshold information sent by the source base station. For example, the strength threshold information is included in the handover message sent by the source base station to the terminal. In a manner, the strength threshold information is included in the handover message. Alternatively, optionally, minimum system information (minimum SI) is carried in the handover message, and the strength threshold information is included in the minimum system information (minimum SI) in the handover message. The strength threshold information may be determined by the source base station, or the strength threshold information may be sent by the target base station and received by the source base station. For example, the strength threshold information is included in the handover request acknowledgement message sent by the target base station to the source base station.

The terminal may receive the strength threshold information sent by the target base station. For example, the strength threshold information is included in system information (SI) that is broadcast by the target base station by using the target cell. The SI may include minimum system information (minimum SI) and other system information (other SI) different from the minimum system information. The strength threshold information may be included in the minimum SI in the SI, or may be included in the OSI.

The strength threshold information includes a first beam signal strength threshold and/or strength threshold indication information, the strength threshold indication information is used to indicate a relationship between the first beam signal strength threshold and a second beam signal strength threshold, and the second beam signal strength threshold is a beam signal strength threshold carried in the measurement configuration message, namely, X mentioned above.

In this embodiment, after receiving the handover message, the terminal determines the first beam signal strength threshold based on the strength threshold information; and compares the signal strength of the L beams in the N beams with the first beam signal strength threshold based on the identification information of the N beams, and determines, based on the RACH configurations of the M beams in the N beams, the beam for accessing the target cell.

The following provides descriptions by using a first beam signal strength threshold Y as an example.

The strength threshold indication information may indicate a relationship between X and Y, for example, indicating whether X is equal to Y. The strength threshold indication information may be a binary bit value. For example, "0" indicates that X is not equal to Y, and "1" indicates that X is equal to Y; vice versa. Alternatively, the strength threshold indication information is a Boolean value. 'TRUE' indicates that X is equal to Y, and 'FALSE' indicates that X is not equal to Y; vice versa. Alternatively, the strength threshold indication information is an information element. When the information element is carried, it indicates that X is not equal to Y, and when the information element is not carried, it indicates that X is equal to Y; vice versa.

If X is equal to Y, optionally, the strength threshold information may not carry the value Y, and after parsing out that "X is equal to Y" indicated in the strength threshold indication information, the terminal determines, based on the value X, the beam for accessing the target cell. Optionally, if X is not equal to Y, the strength threshold information carries the value Y. Optionally, the strength threshold information may not carry the strength threshold indication information.

Optionally, when the identification information of the N beams include identification information of an SS block transmitted on a beam and/or identification information of a CSI-RS transmitted on a beam, the strength threshold indication information may be SS block strength threshold indication information and CSI-RS strength threshold indication information. The first beam signal strength threshold (Y) includes a first SS block beam signal strength threshold (Y1) and a first CSI-RS beam signal strength threshold (Y2).

Optionally, the strength threshold information further includes first indication information. The first indication information is used to indicate a relationship between Y1 and Y2, for example, whether Y1 is equal to Y2. The first indication information may be a binary bit value. For example, "0" indicates that Y1 is not equal to Y2, and "1" indicates that Y1 is equal to Y2; vice versa. Alternatively, the first indication information is a Boolean value. 'TRUE' indicates that Y1 is equal to Y2, and 'FALSE' indicates that Y1 is not equal to Y2; vice versa. Alternatively, the first indication information is an information element. When the information element is carried, it indicates that Y1 is not equal to Y2, and when the information element is not carried, it indicates that Y1 is equal to Y2; vice versa.

If the threshold Y1 is equal to the threshold Y2, optionally, the strength threshold information may carry a threshold, to be specific, Y, where both Y1 and Y2 are Y. Because the strength threshold information carries the threshold Y, after parsing out that "Y1 is equal to Y2" indicated by the first indication information, the terminal uses the value Y (corresponding to both signal strength of the SS block transmitted on a beam and signal strength of a CSI-RS transmitted on a beam) to determine the beam for accessing the target cell. If Y1 is not equal to Y2, the strength threshold information carries two values, that is, Y1 and Y2, and the terminal uses Y1 and Y2 to determine the beam for accessing the target cell.

Based on the description of the strength threshold information, S205 may be specifically: The terminal can determine, based on the received RACH configurations of the M beams in the N beams, that a RACH configuration is configured for each of the M beams (that is, a RACH configuration corresponding to each beam is configured for the beam); and the terminal can obtain the signal strength of the L beams in the N beams, compare the signal strength of the L beams with the first beam signal strength threshold, and determine the beam for accessing on this.

In a first feasible implementation, the N beams include a beam that meets the following two conditions: A RACH configuration is configured for the beam, and signal strength of the beam is greater than or equal to the first beam signal strength threshold.

The terminal determines at least one beam whose signal strength is greater than or equal to the first beam signal strength threshold from the M beams as the beam for accessing the target cell. That is, if determining that a RACH configuration is configured for a beam and signal strength of the beam is greater than or equal to the first beam signal strength threshold, the terminal determines the beam as the beam for accessing the target cell. In this implementation, the determined beam for accessing the target cell belongs to the N beams, and belongs to the M beams.

Optionally, the identification information of the N beams includes identification information of an SS block and/or identification information of a CSI-RS. Therefore, when the N beams include both a beam identified by the identification information of the SS block and a beam identified by the identification information of the CSI-RS, a priority of the beam identified by the identification information of the CSI-RS is higher than that of the beam identified by the identification information of the SS block, and the terminal preferentially determines, as the beam the target cell, a beam configured with a RACH configuration, whose signal strength is greater than or equal to the first beam signal strength threshold, and that is identified by the identification information of the CSI-RS. If no beam identified by identification information of CSI meets the following conditions: The RACH configuration of the beam belongs to the RACH configurations of the M beams and signal strength is greater than or equal to the first beam signal strength threshold; the terminal determines a beam configured with a RACH configuration, whose signal strength is greater than or equal to the first beam signal strength threshold, and that is identified by the identification information of the SS block as the beam for accessing the target cell.

It can be understood that if a plurality of beams that meet the foregoing two conditions are determined in the foregoing manners, the terminal may determine the first found beam that meets the foregoing conditions as the beam for accessing the target cell; or the terminal may randomly select, from the beams that meet the foregoing conditions, the beam for accessing the target cell; or the terminal may select a beam with highest signal strength from the beams that meet the foregoing conditions, as the beam for accessing the target cell; or the terminal may select a beam with a highest priority from the beams that meet the foregoing conditions, as the beam for accessing the target cell. For a beam priority order, refer to the foregoing related descriptions.

Optionally, a priority order of the beam identified by the identification information of the CSI-RS and the beam identified by the identification information of the SS block may be predefined, or may be configured by a network device. For example, the priority order is indicated through the handover message.

A RACH configuration of each of the M beams includes a preamble index and a time-frequency resource configuration. The RACH configuration may be considered as a contention free random access (CFRA) configuration. When the beam that is for accessing the target cell and that is determined by the terminal belongs to the M beams, the terminal initiates a random access process to the target cell based on the RACH configuration of the beam.

In this implementation, the beam that is for accessing the target cell and that is determined by the terminal has the RACH configuration and high signal strength. In this way, a success rate of accessing the target cell by the terminal is higher.

In a second feasible implementation, when signal strength of each of the M beams is less than the first beam signal strength threshold, the beam for accessing the target cell is determined from the M beams. For example, the terminal searches the N beams for the signal strength of M beams, and when the signal strength of each of the M beams is less than the first beam signal strength threshold, determines the beam for accessing the target cell from the M beams. The determined beam for accessing the target cell in this embodiment belongs to the M beams.

When M is greater than 1, the terminal may determine the first found beam in the M beams as the beam for accessing the target cell, the terminal may randomly select, from the M beams, the beam for accessing the target cell, the terminal may select a beam with highest signal strength from the M beams as the beam for accessing the target cell, or the terminal may select a beam with a highest priority from the M beams as the beam for accessing the target cell. For a beam priority order, refer to the foregoing related descriptions.

Optionally, the identification information of the N beams includes identification information of an SS block and/or identification information of a CSI-RS. Therefore, when the N beams include both a beam identified by the identification information of the SS block and a beam identified by the identification information of the CSI-RS, a priority of the beam identified by the identification information of the CSI-RS is higher than that of the beam identified by the identification information of the SS block, and the terminal preferentially determines the beam for accessing the target cell from the beam identified by the identification information of the CSI-RS in the M beams. If the M beams do not include a beam identified by identification information of CSI, the terminal determines the beam for accessing the target cell from the beam identified by the identification information of the SS block in the M beams.

It can be understood that the manner of determining the beam for accessing the target cell from the beam identified by the identification information of the CSI-RS or determining the beam for accessing the target cell from the beam identified by the identification information of the SS block in the M beams is similar to the manner of determining the beam for accessing the target cell from the M beams in the second feasible implementation.

In this implementation, the beam that is for accessing the target cell and that is determined by the terminal has the RACH configuration. In this way, a success rate of accessing the target cell by the terminal is high.

In a third feasible implementation, signal strength of each of the M beams is less than the first beam signal strength threshold, and the L beams include a beam whose signal strength is greater than or equal to the first beam signal strength threshold.

The terminal determines, based on the identifiers of the N beams, the signal strength of the L beams, and the strength threshold information, the beam whose signal strength is greater than or equal to the first beam signal strength threshold as the beam for accessing the target cell. In this case, the beam whose signal strength is greater than or equal to the first beam signal strength threshold may be understood as one of the L beams. That is, the terminal searches the N beams for the signal strength of the L beams, and when the signal strength of each of the M beams is less than the first beam signal strength threshold, the terminal determines the beam for accessing the target cell from the L beams based on that a signal strength threshold of the beam for accessing the target cell is greater than or equal to the first beam signal strength threshold. If the L beams include a plurality of beams whose signal strength is greater than or equal to the first beam signal strength threshold, the terminal may determine the first found beam whose signal strength is greater than or equal to the first beam signal strength threshold as the beam for accessing the target cell. Alternatively, the terminal may randomly select, from the beams whose signal strength is greater than or equal to the first beam signal strength threshold, the beam for accessing the target cell, or the terminal may select a beam with highest signal strength from the beams whose signal strength is greater than or equal to the first beam signal strength threshold as the beam for accessing the target cell, or the terminal may select a beam with a highest priority from the beams whose signal strength is greater than or equal to the first beam signal strength threshold as the beam for accessing the target cell. For a beam priority order, refer to the foregoing related descriptions.

Optionally, the identification information of the N beams includes identification information of an SS block and/or identification information of a CSI-RS. Therefore, when the N beams include both a beam identified by the identification information of the SS block and a beam identified by the identification information of the CSI-RS, a priority of the beam identified by the identification information of the CSI-RS is higher than that of the beam identified by the identification information of the SS block, and the terminal preferentially determines, as the beam for accessing the target cell, a beam whose signal strength is greater than or equal to the first beam signal strength threshold and that is identified by the identification information of the CSI-RS. If the beam identified by identification information of CSI does not include a beam whose signal strength is greater than or equal to the first beam signal strength threshold, the terminal determines, as the beam for accessing the target cell, a beam whose signal strength is greater than or equal to the first beam signal strength threshold and that is identified by the identification information of the SS block.

It can be understood that when there are a plurality of determined beams whose signal strength is greater than or equal to the first beam signal strength threshold and that is identified by the identification information of the CSI-RS or the identification information of the SS block, a processing manner similar to the processing manner used in the third feasible implementation when the L beams include a plurality of beams whose signal strength is greater than or equal to the first beam signal strength threshold, and details are not described herein again.

Optionally, when the beam that is for accessing the target cell and that is determined by the terminal does not belong to the M beams, the terminal may listen to and parse system information of the target cell, and initiate random access to the target cell based on a common RACH configuration in the system information.

In this implementation, the terminal determines that the beam for accessing the target cell has high signal strength. In this way, a success rate of accessing the target cell by the terminal is high.

In a fourth feasible implementation, signal strength of each of the M beams is less than the first beam signal strength threshold, and the L beams do not include a beam whose signal strength is greater than or equal to the first beam signal strength threshold.

The terminal determines, from the L beams based on the identifiers of the N beams and the signal strength of the L beams, a beam with highest signal strength as the beam for accessing the target cell; or the terminal may determine the first found beam in the L beams as the beam for accessing the target cell; or the terminal may randomly select, from the L beams, the beam the target cell; or the terminal may select a beam with a highest priority from the L beams as the beam for accessing the target cell, where for a beam priority order, refer to the foregoing related descriptions.

The determined beam for accessing the target cell in this embodiment belongs to the L beams, but the beam that is for accessing the target cell and that is determined in this case may or may not belong to the M beams.

Optionally, the identification information of the N beams includes identification information of an SS block and/or identification information of a CSI-RS. Therefore, when the N beams include both a beam identified by the identification information of the SS block and a beam identified by the identification information of the CSI-RS, a priority of the beam identified by the identification information of the CSI-RS is higher than that of the beam identified by the identification information of the SS block, and the terminal preferentially determines, as the beam for accessing the target cell, a beam with highest signal strength from the beam identified by the identification information of the CSI-RS in the L beams. If the L beams do not include a beam identified by identification information of CSI, the terminal determines, as the beam the target cell, a beam with highest signal strength from the beam identified by the identification information of the SS block in the L beams. It can be understood that the manner of determining the beam the target cell from the beam identified by the identification information of the CSI-RS or from the beam identified by the identification information of the SS block may alternatively be determining the first found beam as the beam for accessing the target cell, or randomly selecting a beam, or selecting a beam with a highest priority. This is not limited in this embodiment of this application.

In this implementation, the terminal determines, in a relatively flexible manner, the beam for accessing the target cell.

It can be understood that in the foregoing feasible implementations, descriptions are provided by using a case in which M is greater than or equal to 1 as an example. In a possible case, M may alternatively be equal to 0, indicating that the target base station provides no RACH configuration for the beam of the target cell. In this case, the beam for accessing the target cell may be determined in the following manner: The terminal finds L beams in the N beams, and the terminal may determine the beam for accessing the target cell from the L beams. For example, the terminal determines a beam with highest signal strength from the L beams as the beam for accessing the target cell, or the terminal determines the first found beam in the L beams as the beam for accessing the target cell, or the terminal determines a beam with a highest priority from the L beams as the beam the target cell, or the terminal randomly determines, from the L beams, the beam the target cell. It can be understood that when M=0, the manner of determining the beam for accessing the target cell may also be applicable to a scenario in which none of the M beams is found.

In another possible implementation, when none of the M beams is found, or M is equal to 0, or none of the N beams is found, or signal strength of each of the L or M beams is less than the first beam signal strength threshold, it indicates that when the target base station provides no RACH configuration for the beam of the target cell, the beam for accessing may alternatively be determined in one of the following manners.

(1) The terminal determines a beam with highest signal strength from a found beam of the target cell as the beam for accessing the target cell, or the terminal determines the first found beam of the target cell as the beam for accessing the target cell, or the terminal determines a beam with a highest priority from a found beam of the target cell as the beam for accessing the target cell, or the terminal randomly determines, from a beam of the target cell, the beam for accessing the target cell. According to this manner, the terminal preferentially accesses the target cell, to avoid an access failure as much as possible.

(2) The terminal determines a beam with highest signal strength from a found beam as the beam for accessing. Alternatively, the terminal determines the first found beam as the beam for accessing; in this case, the beam may belong to the target cell. Alternatively, the terminal determines a beam with a highest priority from a found beam as a beam for accessing a neighboring cell. Alternatively, the terminal randomly determines the beam for accessing, and the beam may belong to the target cell. The beam for accessing may belong to the target cell, or the beam for accessing may belong to a neighboring cell other than the target cell.

(3) The terminal initiates an RRC connection re-establishment process, and optionally, the terminal performs the RRC connection re-establishment process in a current serving cell.

Based on the foregoing embodiment of this application, optionally, the terminal initiates an RRC connection re-establishment process if the terminal determines the beam in the foregoing manner and initiates a random access process, but the random access process fails, for example, a quantity of times of sending a preamble index by the terminal reaches a maximum quantity of sending times, but the terminal does not receive a random access response (RAR) message returned by the base station. Optionally, the terminal performs the RRC connection re-establishment process in the current serving cell.

The foregoing embodiment of this application provides a plurality of beam for accessing determining manners, so that the terminal flexibly selects a beam for accessing.

Figure 4:
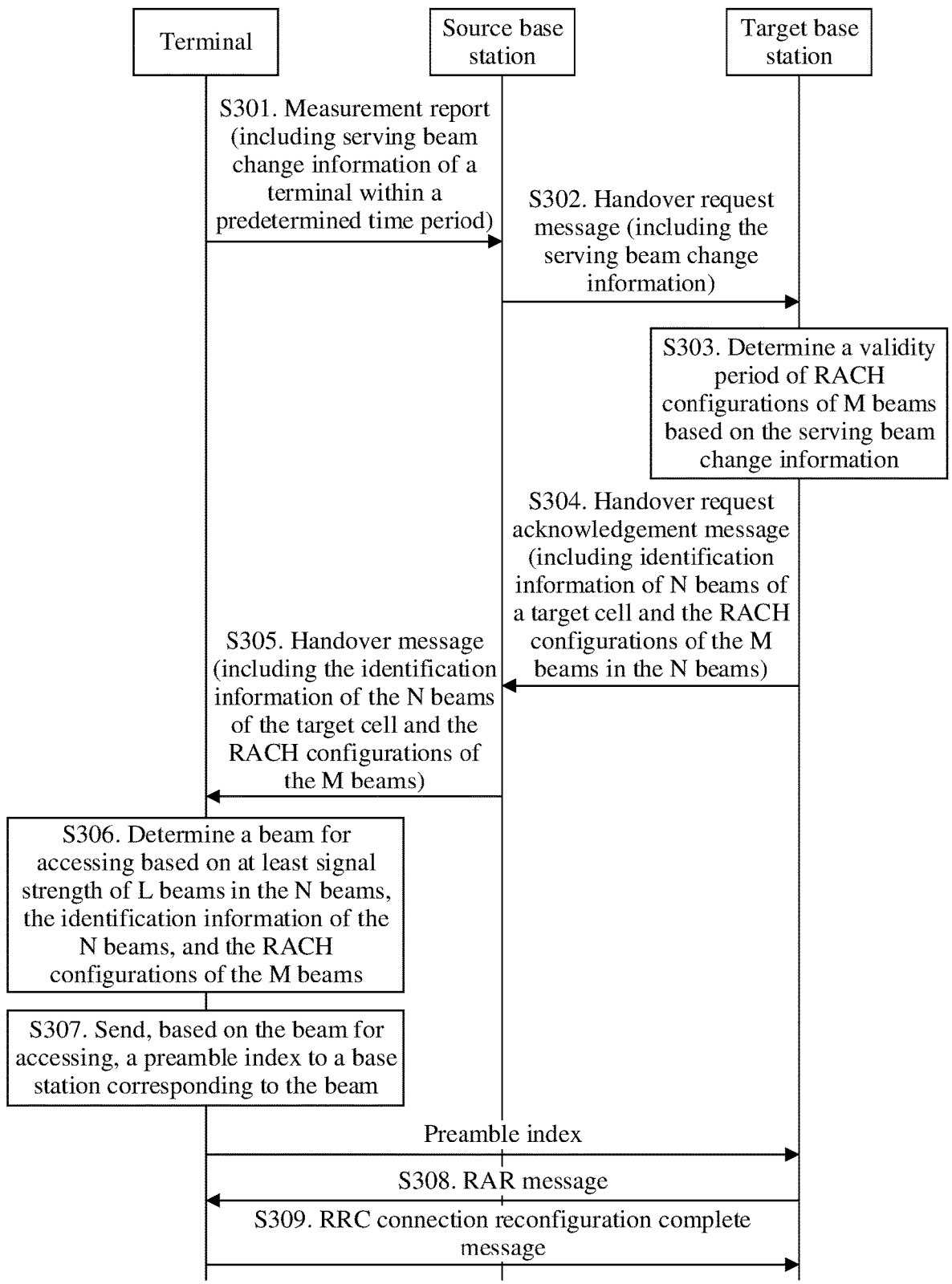
FIG. 4 is a flowchart of a communication method according to Embodiment 3 of this application.

FIG. 4 is a flowchart of a communication method according to Embodiment 3 of this application. As shown in FIG. 4, the method in this embodiment may include the following steps.

S301. A terminal sends a measurement report to a source base station, where the measurement report includes serving beam change information of the terminal within a predetermined time period.

For the measurement report in this embodiment, refer to related descriptions in the embodiment shown in FIG. 3. In addition, the measurement report in this embodiment further includes the serving beam change information of the terminal within the predetermined time period. The serving beam change information is information, for example, a quantity of serving beam changes of the terminal within the predetermined time period or duration for which the terminal stays in each serving beam.

Optionally, the beam change information is not limited to being included in the measurement report, or may be included in a new RRC message, layer-1 signaling, or layer-2 signaling sent by the terminal to the source base station.

S302. The source base station sends a handover request message to a target base station, where the handover request message includes the serving beam change information.

For the handover request message in this embodiment, refer to related descriptions in the embodiment shown in FIG. 3. In addition, the handover request message in this embodiment further includes the serving beam change information.

S303. The target base station determines a validity period of RACH configurations of M beams based on the serving beam change information.

In this embodiment, the target base station may substantially determine a movement status of the terminal based on the serving beam change information, and determine the validity period of the RACH configurations of the M beams based on the movement status of the terminal. If it is determined, based on the serving beam change information, that the terminal changes a serving beam frequently, the validity period of the RACH configurations that are of the M beams and that are to be allocated by the target base station is relatively short, otherwise, the validity period of the RACH configurations that are of the M beams and that are to be allocated by the target base station is relatively long.

In a replaceable solution of S302 and S303, the source base station determines the validity period based on the serving beam change information; and then the source base station sends the handover request message to the target base station, where the handover request message includes the validity period. The target base station determines, based on the handover request message, that the validity period in the handover request message is the validity period of the RACH configurations of the M beams.

It can be understood that after the validity period of the RACH configurations expires, the target base station releases the RACH configurations of the M beams, thereby avoiding wasting resources for a long time.

All of steps S301 to S303 may alternatively be independent of subsequent steps and applied to another scenario or solution. S301 to S303 in this embodiment are applied to, but not limited to, the scenario or solution in this embodiment.

S304. The target base station sends a handover request acknowledgement message to the source base station.

In this embodiment, the handover request acknowledgement message includes identification information of N beams and the RACH configurations of the M beams. For the handover request message in this embodiment, refer to related descriptions in the embodiment shown in FIG. 3.

There is no particular order for performing steps S303 and S304.

S305. The source base station sends a handover message to the terminal, where the handover message includes identification information of N beams of a target cell and the RACH configurations of the M beams.

S306. The terminal determines a beam for accessing based on at least signal strength of L beams in the N beams, the identification information of the N beams, and the RACH configurations of the M beams.

In this embodiment, for S305 and S306, refer to related descriptions in the foregoing embodiments. Details are not described herein again.

S307. The terminal sends, based on the beam for accessing, a preamble index to a base station corresponding to the beam.

Herein, the base station corresponding to the beam may be the target base station, or may be another base station. FIG. 4 shows an example in which the base station corresponding to the beam is the target base station, but this is not limited in this embodiment.

S308. The base station corresponding to the beam sends a random access response (RAR) message to the terminal.

If the terminal determines that a beam for accessing the target cell belongs to the M beams, it indicates that a RACH configuration is configured for the beam for accessing the target cell. In this case, the terminal sends a preamble index to the target base station by using the RACH configuration. The target base station determines, based on the preamble index sent by the terminal and/or a time-frequency resource used for sending the preamble index, a beam selected for random access performed by the terminal to the target cell, the target base station sends an RAR message to the terminal based on the beam, and the target base station releases RACH configurations of other beams in the M beams.

If the terminal determines that a beam for accessing the target cell does not belong to the M beams, it indicates that no RACH configuration is configured for the beam for accessing the target cell. In this case, the terminal sends a randomly selected preamble index to the target base station on a common random access channel time-frequency resource.

S309. The terminal sends an RRC connection reconfiguration complete message to the base station corresponding to the beam.

After receiving the RAR message, the terminal sends the RRC connection reconfiguration complete message to the base station corresponding to the beam.

In this embodiment, according to the foregoing solution, the terminal determines the beam for accessing the target cell, and a success rate of accessing the target cell by the terminal can be improved based on the beam, increasing a handover success rate. In addition, the terminal further reports the serving beam change information of the terminal, so that the target base station determines the validity period of the RACH configurations of the M beams, and after the validity period expires, releases the RACH configurations of the M beams, avoiding occupying resources for a long time and increasing resource utilization.

It can be understood that in the foregoing embodiments, the methods or steps implemented by the terminal may alternatively be implemented by a chip inside the terminal. The methods or steps implemented by a base station such as the source base station may alternatively be implemented by a chip inside the base station.

Figure 5:
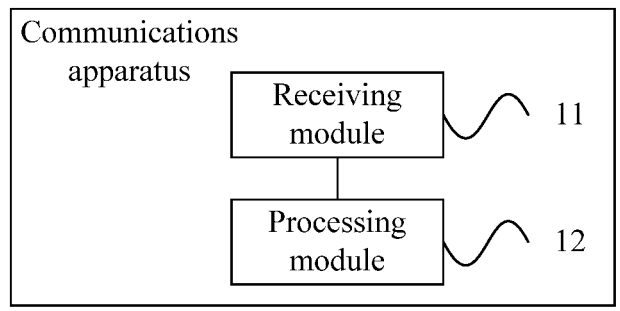
FIG. 5 is a schematic structural diagram of a communications apparatus according to an embodiment of this application.

An embodiment of this application provides a communications apparatus. The communications apparatus may be a terminal, or may be a chip inside a terminal. As shown in FIG. 5, the communications apparatus in this embodiment may include a receiving module 11 and a processing module 12.

The receiving module 11 is configured to receive identification information of N beams of a target cell and random access channel configurations of M beams in the N beams, where N and M are positive integers.

The processing module 12 is configured to determine a beam for accessing based on signal quality or signal strength of L beams in the N beams, the identification information of the N beams, and the random access channel configurations of the M beams, where L is a nonnegative integer.

Optionally, the processing module 12 is specifically configured to determine the beam for accessing based on the signal strength of the L beams in the N beams, strength threshold information, the identification information of the N beams, and the random access channel configurations of the M beams.

Optionally, the receiving module 11 is further configured to receive the strength threshold information.

Optionally, the strength threshold information includes a first beam signal strength threshold or strength threshold indication information, the strength threshold indication information is used to indicate a relationship between the first beam signal strength threshold and a second beam signal strength threshold, and the second beam signal strength threshold is a beam signal strength threshold carried in measurement configuration information.

Optionally, the processing module 12 is specifically configured to determine, based on the signal strength of the L beams in the N beams, the strength threshold information, the identification information of the N beams, and the random access channel configurations of the M beams, a beam whose signal strength is greater than or equal to the first beam signal strength threshold from the M beams as the beam for accessing the target cell.

Optionally, the processing module 12 is specifically configured to: when signal strength of each of the M beams is less than the first beam signal strength threshold, determine, from the M beams based on the identification information of the N beams and the random access channel configurations of the M beams, the beam for accessing the target cell.

Optionally, the processing module 12 is specifically configured to: when signal strength of each of the M beams is less than the first beam signal strength threshold, determine, based on the identifiers of the N beams, the signal strength of the L beams, and the strength threshold information, a beam whose signal strength is greater than or equal to the first beam signal strength threshold from the L beams as the beam for accessing the target cell.

Optionally, the processing module 12 is specifically configured to determine, based on the signal strength of the L beams, the strength threshold information, the identification information of the N beams, a priority order of the N beams, and the random access channel configurations of the M beams, the beam for accessing the target cell.

Optionally, the processing module 12 is specifically configured to: when none of the M beams is found, determine, based on the identification information of the N beams, a beam with highest signal strength in the L beams as the beam for accessing the target cell.

Optionally, the identification information of the N beams includes synchronization signal block identification information and/or channel state information-reference signal identification information.

The processing module 12 is specifically configured to determine the beam for accessing based on the signal strength of the L beams in the N beams, the strength threshold information, the identification information of the N beams, that a priority of a beam whose identification information is the channel state information-reference signal identification information is higher than that of a beam whose identification information is the synchronization signal block identification information, and the random access channel configurations of the M beams.

Optionally, the processing module 12 is further configured to: if none of the N beams is found, the signal strength of the L beams or signal strength of the M beams is less than the first beam signal strength threshold, or none of the M beams is found, determine the first found beam as the beam for accessing, determine a beam with highest signal strength as the beam for accessing, randomly determine a found beam as the beam for accessing, or determine a beam with a highest priority in found beams as the beam for accessing.

Optionally, the random access channel configuration includes a preamble index and a time-frequency resource configuration.

The communications apparatus described in this embodiment may be configured to execute the technical solutions executed by the terminal/the terminal chip in the foregoing method embodiments. An implementation principle and a technical effect of the communications apparatus are similar to those of the foregoing method embodiments. For functions of the modules, refer to corresponding descriptions in the method embodiments. Details are not described herein.

Figure 6:
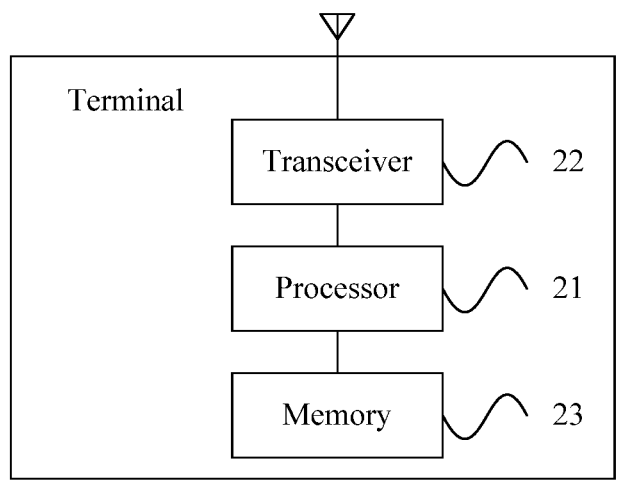
FIG. 6 is a schematic structural diagram of a terminal according to an embodiment of this application.

FIG. 6 is a schematic structural diagram of a terminal according to an embodiment of this application. As shown in FIG. 6, the terminal in this embodiment may include a processor 21 and a transceiver 22. The processor 21 is communicatively connected to the transceiver 22.

In hardware implementation, the receiving module 11 may be the transceiver 22 in this embodiment. Alternatively, the transceiver 22 includes a transmitter and a receiver; in this case, the receiving module 11 may be the receiver of the transceiver 22. The processing module 12 may be embedded in or independent of the processor 21 of the terminal in a form of hardware.

The transceiver 22 may include necessary radio frequency communications devices such as a frequency mixer. The processor 21 may include at least one of a central processing unit (CPU), a digital signal processor (DSP), a microcontroller unit (MCU), an application-specific integrated circuit (ASIC), or a field-programmable gate array (FPGA).

Optionally, the terminal in this embodiment may further include a memory 23. The memory 23 is configured to store a program instruction. The processor 21 is configured to invoke the program instruction in the memory 23 to execute the foregoing solutions.

The program instruction may be implemented in a form of a software functional unit and can be sold or used as an independent product. The memory 23 may be a computer readable storage medium in any form. Based on such understanding, all or some of the technical solutions of this application may be represented in a form of a software product, and the software product includes several instructions for instructing a computer device, which may be specifically the processor 21, to perform all or some of the steps of the terminal in the embodiments of this application.

The computer readable storage medium includes various media that can store program code, such as a USB flash drive, a removable hard disk, a read-only memory (ROM), a random access memory (RAM), a magnetic disk, and a compact disc.

The terminal described in this embodiment may be configured to execute the technical solutions executed by the terminal or the chip inside the terminal in the foregoing method embodiments of this application. An implementation principle and a technical effect of the terminal are similar to those of the foregoing method embodiments. For functions of the modules, refer to corresponding descriptions in the method embodiments. Details are not described herein.

Figure 7:
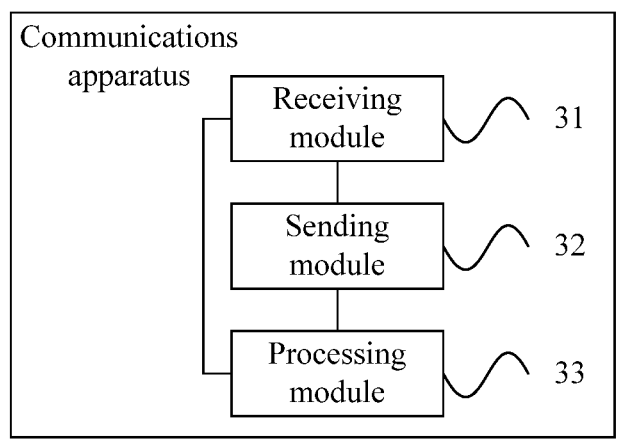
FIG. 7 is a schematic structural diagram of a communications apparatus according to an embodiment of this application.

An embodiment of this application provides a communications apparatus. The communications apparatus may be a network device or a chip inside a network device. As shown in FIG. 7, the communications apparatus may include a receiving module 31 and a sending module 32.

The receiving module 31 is configured to receive identification information of N beams of a target cell and random access channel configurations of M beams in the N beams that are sent by a second network device, where N and M are positive integers.

The sending module 32 is configured to send the identification information of the N beams and the random access channel configurations of the M beams to a terminal.

Optionally, the receiving module 31 is further configured to receive serving beam change information of the terminal that is within a predetermined time period and that is sent by the terminal.

The sending module 32 is further configured to send the serving beam change information to the second network device, where the serving beam change information is used by the second network device to determine a validity period of the random access channel configurations of the M beams.

Optionally, the communications apparatus in this embodiment further includes a processing module 33.

The receiving module 31 is further configured to receive serving beam change information of the terminal that is within a predetermined time period and that is sent by the terminal.

The processing module 33 is configured to determine a validity period of the random access channel configurations of the M beams based on the serving beam change information.

The sending module 32 is further configured to send the validity period of the random access channel configurations of the M beams to the second network device.

Optionally, the random access channel configuration includes a preamble index and a time-frequency resource configuration.

Optionally, the sending module 32 is further configured to send strength threshold information or quality threshold information of a beam signal to the terminal through a handover message.

The communications apparatus described in this embodiment may be configured to execute the technical solutions executed by the source base station or a chip inside the source base station in the foregoing method embodiments. An implementation principle and a technical effect of the communications apparatus are similar to those of the foregoing method embodiments. For functions of the modules, refer to corresponding descriptions in the method embodiments. Details are not described herein.

Figure 8:
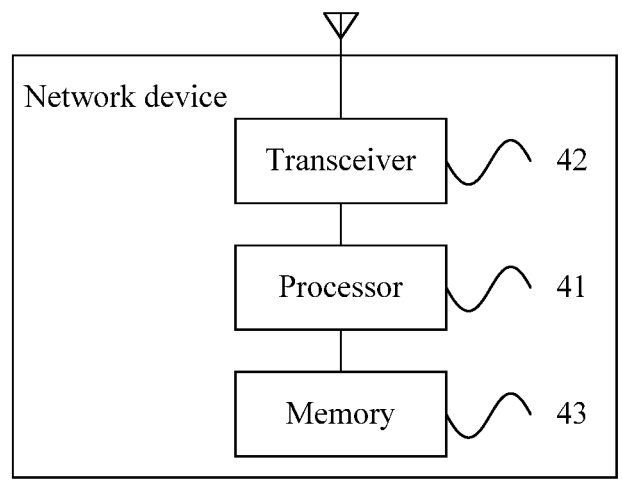
FIG. 8 is a schematic structural diagram of a network device according to an embodiment of this application.

FIG. 8 is a schematic structural diagram of a network device according to an embodiment of this application. As shown in FIG. 8, the network device in this embodiment may include a processor 41 and a transceiver 42. The processor 41 is communicatively connected to the transceiver 42.

In hardware implementation, the receiving module 31 and the sending module 32 may be the transceiver 42 in this embodiment. Alternatively, the transceiver 42 includes a transmitter and a receiver; in this case, the receiving module 31 may be the receiver of the transceiver 42, and the sending module 32 may be the transmitter of the transceiver 42. The processing module 33 may be embedded in or independent of the processor 41 of the network device in a form of hardware.

The transceiver 42 may include necessary radio frequency communications devices such as a frequency mixer. The processor 41 may include at least one of a CPU, a DSP, an MCU, an ASIC, or an FPGA.

Optionally, the network device in this embodiment may further include a memory 43. The memory 43 is configured to store a program instruction. The processor 41 is configured to invoke the program instruction in the memory 43 to execute the foregoing solutions.

The program instruction may be implemented in a form of a software functional unit and can be sold or used as an independent product. The memory 43 may be a computer readable storage medium in any form. Based on such understanding, all or some of the technical solutions of this application may be represented in a form of a software product, and the software product includes several instructions for instructing a computer device, which may be specifically the processor 41, to perform all or some of the steps of the network device in the embodiments of this application. The computer readable storage medium includes various media that can store program code, such as a USB flash drive, a removable hard disk, a ROM, a RAM, a magnetic disk, and a compact disc.

The network device in this embodiment may be configured to execute the technical solutions of the source base station in the foregoing method embodiments of this application. An implementation principle and a technical solution of the network device are similar to those of the foregoing method embodiments, and details are not described herein.

Figure 9:
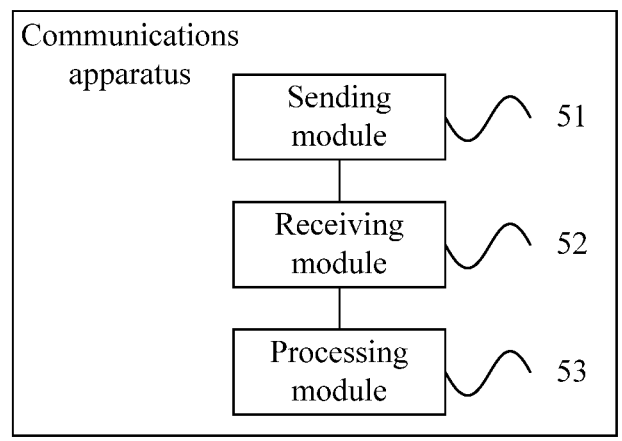
FIG. 9 is a schematic structural diagram of a communications apparatus according to an embodiment of this application.

An embodiment of this application provides a communications apparatus. The communications apparatus may be a network device or a chip inside a network device. As shown in FIG. 9, the communications apparatus may include a sending module 51.

The sending module 51 is configured to send identification information of N beams of a target cell and random access channel configurations of M beams in the N beams to a first network device, where N and M are positive integers.

Optionally, the communications apparatus further includes a receiving module 52 and a processing module 53.

In a feasible implementation, the receiving module 52 is configured to receive serving beam change information of a terminal that is within a predetermined time period and that is sent by the first network device.

The processing module 53 is configured to: determine a validity period of the random access channel configurations of the M beams based on the serving beam change information; and after the validity period expires, release the random access channel configurations of the M beams.

In a feasible implementation, the receiving module 52 is configured to receive the validity period of the random access channel configurations of the M beams that is sent by the first network device.

The processing module 53 is configured to: after the validity period expires, release the random access channel configurations of the M beams.

Optionally, the sending module 51 is further configured to send strength threshold information or quality threshold information of a beam signal to the terminal through system information.

The communications apparatus described in this embodiment may be configured to execute the technical solutions executed by the target base station or a chip inside the target base station in the foregoing method embodiments. An implementation principle and a technical effect of the communications apparatus are similar to those of the foregoing method embodiments. For functions of the modules, refer to corresponding descriptions in the method embodiments. Details are not described herein.

Figure 10:
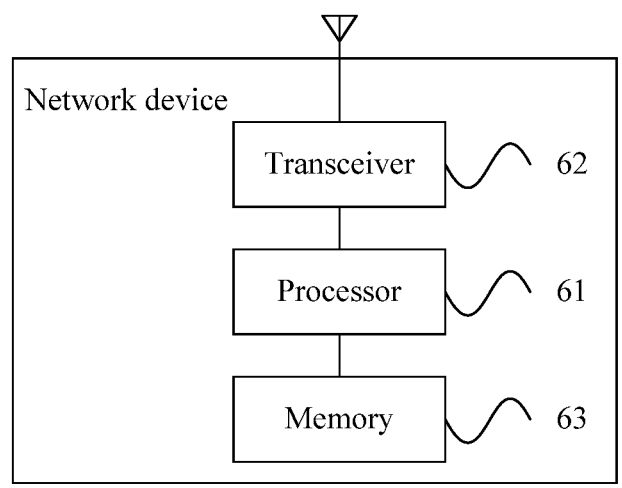
FIG. 10 is a schematic structural diagram of a network device according to an embodiment of this application.

FIG. 10 is a schematic structural diagram of a network device according to an embodiment of this application. As shown in FIG. 10, the network device in this embodiment may include a processor 61 and a transceiver 62. The processor 61 is communicatively connected to the transceiver 62.

In hardware implementation, the receiving module 52 and the sending module 51 may be the transceiver 62 in this embodiment. Alternatively, the transceiver 62 includes a transmitter and a receiver; in this case, the receiving module 52 may be the receiver of the transceiver 62, and the sending module 51 may be the transmitter of the transceiver 62. The processing module 53 may be embedded in or independent of the processor 61 of the network device in a form of hardware.

The transceiver 62 may include necessary radio frequency communications devices such as a frequency mixer. The processor 61 may include at least one of a CPU, a DSP, an MCU, an ASIC, or an FPGA.

Optionally, the network device in this embodiment may further include a memory 63. The memory 63 is configured to store a program instruction. The processor 61 is configured to invoke the program instruction in the memory 63 to execute the foregoing solutions.

The program instruction may be implemented in a form of a software functional unit and can be sold or used as an independent product. The memory 63 may be a computer readable storage medium in any form. Based on such understanding, all or some of the technical solutions of this application may be represented in a form of a software product, and the software product includes several instructions for instructing a computer device, which may be specifically the processor 61, to perform all or some of the steps of the network device in the embodiments of this application. The computer readable storage medium includes various media that can store program code, such as a USB flash drive, a removable hard disk, a ROM, a RAM, a magnetic disk, and a compact disc.

The network device in this embodiment may be configured to execute the technical solutions of the target base station in the foregoing method embodiments of this application. An implementation principle and a technical solution of the network device are similar to those of the foregoing method embodiments, and details are not described herein.

It should be noted that module division in the embodiments of this application is an example and is merely logical function division. During actual implementation, there may be another division manner. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in a form of a software functional module and sold or used as an independent product, the integrated module may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The storage medium includes various media that can store program code, such as a USB flash drive, a removable hard disk, a read-only memory (ROM), a random access memory (RAM), a magnetic disk, and a compact disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer readable storage medium or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method, comprising:

receiving, by a first network device from a terminal, serving beam change information of the terminal, wherein the serving beam change information of the terminal comprises information of a change of a serving beam of the terminal that has occurred within a preset time period; and sending, by the first network device, the serving beam change information of the terminal to a second network device, wherein the serving beam change information of the terminal is usable for the second network device to determine a validity period of random access channel configurations corresponding to M beams;

receiving, by the first network device from the second network device, identification information of N beams of a target cell and the random access channel configurations corresponding to the M beams, wherein the N beams comprise the M beams, and N and M are positive integers; and sending, by the first network device, the identification information of the N beams and the random access channel configurations corresponding to the M beams to a terminal.

2. The method according to claim 1, wherein each random access channel configuration of the random access channel configurations corresponding to the M beams comprises a respective preamble index and a respective time-frequency resource configuration.

3. The method according to claim 1, further comprising:
sending, by the first network device, strength threshold information or quality threshold information of a beam signal to the terminal.

4. A method, comprising:
receiving, by a terminal, identification information of N beams of a target cell and random access channel configurations corresponding to M beams in the N beams, wherein N and M are positive integers, and each random access channel configuration of the random access channel configurations corresponding to the M beams comprises a respective preamble index and a respective time-frequency resource configuration;

in response to the M beams comprising at least one beam whose signal strength is greater than or equal to a first beam signal strength threshold, selecting, by the terminal, a first beam from the at least one beam, wherein the first beam has a signal strength that is greater than or equal to the first beam signal strength threshold and has a corresponding preamble index and a corresponding time-frequency resource configuration; and in response to a signal strength of each of the M beams being less than the first beam signal strength threshold, selecting, by the terminal, a second beam whose signal strength is greater than or equal to the first beam signal strength threshold from L beams, wherein L is a non-negative integer, and the L beams are all beams whose signal strength is detected by the terminal, and wherein the first beam and the second beam are allocated to be used for a random access procedure in the target cell.

5. The method according to claim 4, further comprising:
receiving, by the terminal, the first beam signal strength threshold.

6. The method according to claim 5, wherein receiving, by the terminal, the first beam signal strength threshold comprises:
receiving, by the terminal, the first beam signal strength threshold through a radio resource control (RRC) connection reconfiguration message.

7. The method according to claim 4, further comprising:
in response to none of the M beams being found by the terminal, selecting, by the terminal, based on the identification information of the N beams, a beam with a highest signal strength in the L beams.

8. The method according to claim 4, wherein none of the N beams is found, a respective signal strength of each of the L beams or each of the M beams is less than the first beam signal strength threshold, or none of the M beams is found, and the method further comprises:
selecting, by the terminal, an earliest found beam;
selecting, by the terminal, a beam with a highest signal strength;
randomly selecting, by the terminal, a found beam; or
selecting, by the terminal, a beam with a highest priority in beams found by the terminal.

9. The method according to claim 4, wherein selecting, by the terminal, the first beam, the first beam having a signal strength that is greater than or equal to the first beam signal strength threshold and having a corresponding preamble index and a corresponding time-frequency resource configuration comprises:
selecting, by the terminal, based on a priority order of the N beams and the random access channel configurations corresponding to the M beams, the first beam from the at least one beam.

10. The method according to claim 4, wherein the identification information of the N beams comprises synchronization signal block identification information of at least one of the N beams or channel state information-reference signal identification information of at least one of the N beams.

11. The method according to claim 10, wherein a priority of a beam whose identification information is comprised in the channel state information-reference signal identification information is higher than that of a beam whose identification information is comprised in the synchronization signal block identification information.

12. An apparatus, comprising:
a receiver, configured to:
receive identification information of N beams of a target cell and random access channel configurations corresponding to M beams in the N beams, wherein N and M are positive integers, and each random access channel configuration of the random access channel configurations corresponding to the M beams comprises a respective preamble index and a respective time-frequency resource configuration; and a processor, configured to:
in response to the M beams comprising at least one beam whose signal strength is greater than or equal to a first beam signal strength threshold, selecting a first beam from the at least one beam, wherein the first beam has signal strength that is greater than or equal to the first beam signal strength threshold and has a corresponding preamble index and a corresponding time-frequency resource configuration; and in response to signal strength of each of the M beams being less than the first beam signal strength threshold, selecting a second beam whose signal strength is greater than or equal to the first beam signal strength threshold from L beams, wherein L is a nonnegative integer, and the L beams are all beams whose signal strength is detected by a terminal, and wherein the first beam and the second beam are allocated to be used in a random access procedure in the target cell.

13. The apparatus according to claim 12, wherein the receiver is further configured to receive the first beam signal strength threshold.

14. The apparatus according to claim 12, wherein the first beam signal strength threshold is carried in a radio resource control (RRC) connection reconfiguration message.

15. The apparatus according to claim 12, wherein the processor is further configured to:
when none of the M beams is found by the apparatus, select, based on the identification information of the N beams, a third beam with a highest signal strength in the L beams.

16. The apparatus according to claim 12, wherein the processor is further configured to:
in response to none of the N beams being found, a signal strength of each of the L beams or the M beams being less than the first beam signal strength threshold, or none of the M beams being found, determine as follows:
- select an earliest found beam;
- select a beam with a highest signal strength;
- randomly select a found beam; or
- select a beam with a highest priority in found beams.

17. The apparatus according to claim 12, wherein the processor is further configured to:
- select, based on a priority order of the N beams and the random access channel configurations of the M beams, the first beam.

18. The apparatus according to claim 12, wherein the identification information of the N beams comprises synchronization signal block identification information of at least one of the N beams or channel state information-reference signal identification information of at least one of the N beams.

19. The apparatus according to claim 18, wherein a priority of a beam whose identification information is comprised in the channel state information-reference signal identification information is higher than that of a beam whose identification information is comprised in the synchronization signal block identification information.

20. A non-transitory computer readable storage medium, wherein the non-transitory computer readable storage medium stores a program to be executed by a processor, the program including instructions for:
- receiving identification information of N beams of a target cell and random access channel configurations corresponding to M beams in the N beams, wherein N and M are positive integers, and each random access channel configuration of the random access channel configurations corresponding to the M beams comprises a respective preamble index and a respective time-frequency resource configuration; and
- in response to the M beams comprising at least one beam whose signal strength is greater than or equal to a first beam signal strength threshold, selecting a first beam from the at least one beam, wherein the first beam has a signal strength that is greater than or equal to the first beam signal strength threshold and has a corresponding preamble index and a corresponding time-frequency resource configuration;
- in response to a signal strength of each of the M beams being less than the first beam signal strength threshold, selecting a second beam whose signal strength is greater than or equal to the first beam signal strength threshold from L beams, wherein L is a nonnegative integer, and the L beams are all beams whose signal strength is detected by a terminal, and wherein the first beam and the second beam are allocated to be used in a random access procedure in the target cell.

21. The medium according to claim 20, wherein the program further includes instructions for:
- receiving the first beam signal strength threshold.

22. The medium according to claim 20, wherein the program further includes instructions:
- in response to none of the M beams being found by a terminal, selecting, based on the identification information of the N beams, a third beam with a highest signal strength in the L beams.

23. The medium according to claim 20, wherein the program further includes instructions for:
- in response to none of the N beams being found, a signal strength of each of the L beams or the M beams being less than the first beam signal strength threshold, or none of the M beams being found, determining the following:
- selecting an earliest found beam;
- selecting a beam with a highest signal strength;
- randomly selecting a found beam; or
- selecting a beam with a highest priority in found beams.

* * * * *

UNITED STATES PATENT AND TRADEMARK OFFICE
CERTIFICATE OF CORRECTION

PATENT NO. : 10,785,805 B2
APPLICATION NO. : 16/536003
DATED : September 22, 2020
INVENTOR(S) : Le Yan Page 1 of 1

It is certified that error appears in the above-identified patent and that said Letters Patent is hereby corrected as shown below:

In Column 32, Line 6, Claim 20, delete "resource configuration;" and insert --resource configuration; and--.

Signed and Sealed this
Fifteenth Day of December, 2020

Andrei Iancu
*Director of the United States Patent and Trademark Office*